United States Patent [19]
Gallagher et al.

[11] 3,812,343
[45] May 21, 1974

[54] ROLLER BEARING DISCRIMINATOR FOR A RAILROAD HOT BOX DETECTOR SYSTEM

[75] Inventors: Cornelius A. Gallagher, Syosset; Arthur J. Glazar, Kings Park, both of N.Y.

[73] Assignee: Servo Corporation of America, Hicksville, N.Y.

[22] Filed: Aug. 27, 1973

[21] Appl. No.: 391,529

[52] U.S. Cl.......... 246/169 A, 246/169 D, 340/231, 73/9
[51] Int. Cl.......... B61l 1/20, B61l 3/06, B61l 23/02
[58] Field of Search........ 246/169 D, 169 A, 169 R; 340/231; 73/9

[56] References Cited
UNITED STATES PATENTS

| | | | |
|---|---|---|---|
| 2,963,575 | 12/1960 | Pelino et al. | 246/169 D |
| 3,033,018 | 5/1962 | Haggadone | 73/9 |
| 3,206,596 | 9/1965 | Howell | 246/169 D |
| 3,506,849 | 4/1970 | Waller | 246/169 R X |
| 3,594,744 | 7/1971 | Caulier | 340/231 X |
| 3,731,087 | 5/1973 | King | 246/169 D |

Primary Examiner—Robert S. Ward, Jr.
Attorney, Agent, or Firm—Kane, Dalsimer, Kane, Sullivan and Kurucz

[57] ABSTRACT

A circuit is provided for distinguishing electrical signals generated by a hot box detector scanner in response to a passing roller bearing from those generated in response to a passing friction bearing. The circuit includes first and second capacitors for storing the maximum amplitude of each output signal wave from the scanner and for storing the maximum amplitude of each wave at a predetermined point. The ratio of the charges stored on the capacitors is then obtained. It has been found that for a roller bearing this ratio should approach unity while for a friction bearing the ratio is not close unity.

10 Claims, 2 Drawing Figures

ROLLER BEARING DISCRIMINATOR FOR A RAILROAD HOT BOX DETECTOR SYSTEM

BACKGROUND OF THE INVENTION

The present invention relates to a railroad hot box detector system and more particularly to a circuit which enables such hot box detectors to discriminate between passing friction and roller bearings.

A railroad hot box detector system is designed to produce an output for each journal bearing passing the detector's field of view. The output is roughly proportional to the temperature rise of the journal bearing. When an overheated journal bearing is scanned, the magnitude of the output signal is usually conspicuous when compared to the preponderance of normal journal bearings on a particular train. The manner in which the output signals are evaluated can vary in concept and complexity depending upon many factors such as cost, efficacy, and reliability.

One basic method of evaluation consists of displaying the output signals as "pips" on a strip chart recording with the pip-height representing the magnitude of the detector output. Each axle generates a pair of pips representing the two journal bearings, left and right, (or Rail 1 and Rail 2), associated with each axle. A trained observer can inspect such chart recordings and assess various factors to decide whether a particular pip represents a possibly defective journal bearing.

Methods have been developed to aid such trained observers, or to eliminate the human observer entirely, by mechanizing the evaluation of hot box detector signals. All attempts at total mechanization have been found, by experience, to be less effective than manual evaluation, due to the many variables which must be assessed.

One basic mechanization is a simple "absolute alarm monitor". In this scheme, any output pulse which exceeds a predetermined amplitude threshold generates an alarm signal. Another mechanization compares the two output signals produced by journal bearings at opposite ends of each axle; if the comparison indicates that one heat pulse exceeds the other by a predetermined amount, an alarm signal is produced. The comparison may be either geometric (i.e., the ratio between the two heat signals is computed) or arithmetic (i.e., the algebraic difference between the two heat signals is computed). The latter configuration is commonly called a "differential alarm monitor".

The combination of both an "absolute" and a "differential" alarm is in common use at the present time and probably represents the largest percentage of automated or semi-automated evaluation devices in regular service.

A fundamental limitation is imposed on the efficacy of absolute and differential alarm monitors due to the mixture of roller bearings and friction bearings (also known variously as solid or sleeve bearings) encountered on a given train. Due to physical differences between friction and roller bearings, the output signals from roller bearings are significantly higher (all other factors being equal) than signals from friction bearings and the rail-to-rail differential generated by roller bearings is also greater than that of friction bearings.

It has also been observed that there are characteristic differences between the waveshapes of signals generated by passing roller bearings and friction bearings when scanned by a hot box detector such as the Servosafe Hotbox Detective system marketed by the Servo Corporation of America of Hicksville, N.Y. The leading edge of the friction bearing has a slower rate of change than its trailing edge, whereas the roller bearing has essentially similar leading and trailing edge rates of change. These differences result from two factors: first, the manner in which the infrared sensor views the moving journal bearing (i.e., its field of view, scanning angle, distance to bearing, etc., which in total comprise the "scan geometry") and second, physical differences in the structure of the two bearing types.

In general, it is desirable to set alarm threshold levels of both the absolute and differential alarm monitors to some minimum value just above "normal" signal amplitude (plus a "guard band" to accommodate reasonable variations from the norm). However, such minimums presently must be based upon roller bearing norms since these are higher than those of friction bearings. Because of this, friction bearings must experience a greater percentage rise above the norm than roller bearings before tripping an alarm. Clearly, it would be desirable to be able to distinguish between roller bearings and friction bearings so that optimum alarm levels may be applied to each type of bearing.

In view of the above, it is the principal object to provide a circuit which, utilizing the characteristic differences between the roller bearing and friction bearing waveshapes, can discriminate, with reasonable certainty, between roller bearing generated signals and friction bearing generated signals.

SUMMARY OF THE INVENTION

The above and other beneficial objects and advantages are attained in accordance with the present invention by providing a circuit for distinguishing electrical signals generated by a hot box detector scanner in response to a passing roller bearing from those generated in response to a passing friction bearing. The circuit includes first and second capacitors for storing the maximum amplitude of each output signal wave form and the amplitude of the wave form at a predetermined point. The ratio of the charges stored on the capacitors is then obtained. It has been found that for a roller bearing this ratio should approach unity or more particularly 1.2:1 while for a friction bearing the ratio is not close unity.

DETAILED DESCRIPTION OF THE PREFERRED EMBODIMENT

Figure 1:
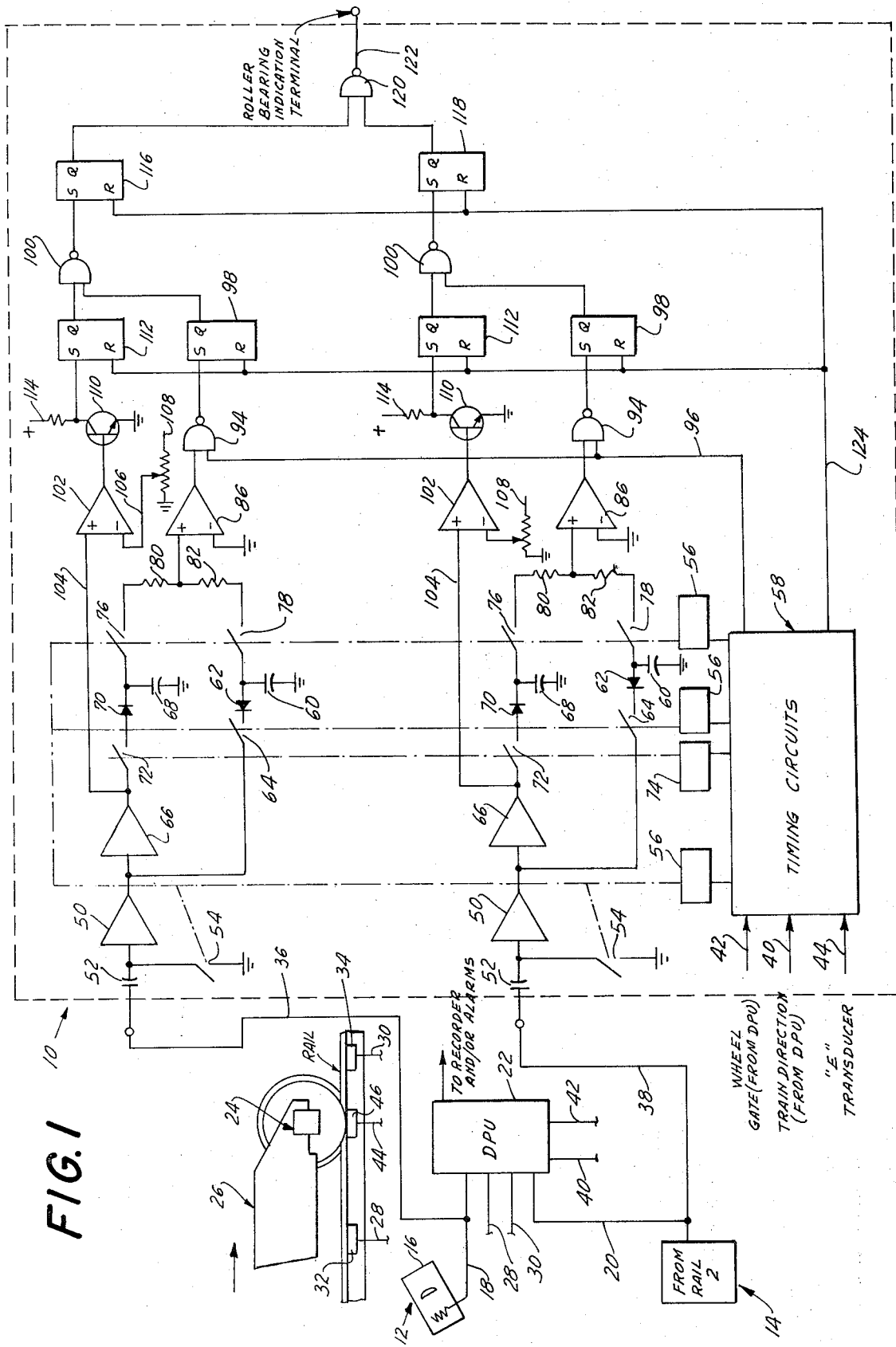
FIG. 1 is a schematic representation of a roller bearing discriminator circuit in accordance with the present invention.

Reference is now made to the drawings wherein a roller bearing discriminator circuit 10 is depicted interconnected (as much as is necessary for purposes of the present description) with a conventional hot box detector system such as the previously mentioned SERVOSAFE HOTBOX DETECTIVE SYSTEM of the Servo Corporation of America. The hot box detector system includes a pair of scanners 12 and 14 including trackside, infrared sensors 16 imaged respectively to scan rails 1 and 2 of a railroad track. The construction and connections of both scanners are identical and, accordingly, only scanner 12 is illustrated in connection with rail 1. It should be appreciated that an identical scanner would be provided for rail 2.

The outputs of the scanners comprise inputs, along lines 18 and 20 to a data processing unit 22 which amplifies, clamps, shapes and otherwise processes the signals generated by the scanners in response to the infrared scanning of the bearings 24 of a passing train carriage 26. The processed signals, comprising the outputs of the dpu 22, are then used to drive a recorder and/or alarm monitors (not shown). The data processing unit 22 also receives inputs along lines 28 and 30 from wheel sensors 32 and 34 positioned along the rails of a section of track in the vicinity of the hot box detector installation.

The wheel sensors 32 and 34 comprise standard equipment on hot box detector systems and the various functions, described below, which they perform, are well known and appreciated in the art. Thus, the sensor 32 senses the approach of a train into the field of view of the scanner and causes the system to perform certain preliminary functions such as determining the direction of approach of the train, opening protective aperture blades in front of the infrared scanners, starting the drive motor for the recorder and generating the start of a WHEEL GATE signal in the dpu 22. The wheel gate signal 33 illustrated on the first line of FIG. 2 starts just before a journal box enters the field of view of scanner 16 as determined by sensor 32 and terminates just after the journal leaves the field of view of the scanner as sensed by wheel scanner 34.

In addition to serving as inputs to the dpu 22, in accordance with the present invention the outputs of sensors 12 and 14 serve as inputs to the roller bearing discriminator circuit 10 along lines 36 and 38 respectively. As previously discussed, the waveshapes of the output signal from sensors 12 and 14 are determined by the type of bearing being viewed. Accordingly, in FIG. 2, line 3, there are shown representative wave forms typical in shape to the output signal 39 generated by the passage of a roller bearing past the scanner and 41 typical in shape to the output signal of a friction bearing past the scanner.

Additional inputs to circuit 10 are train direction and wheel gate signals from the dpu along lines 40 and 42 respectively. As pointed out previously, both of these signals are generated responsive to inputs from the wheel sensors. An additional input to circuit 10 is along line 44 and is the output of a third wheel sensor 46 positioned along the rail intermediate to sensors 32 and 34. As will be described in detail forthwith, the input to circuit 10 from sensor 46 is used to trigger a sample gate signal 48 depicted on line 2 of FIG. 2.

Roller bearing discriminator 10 includes a pair of identical subcircuits, one associated with each of the rails. Accordingly, the following discussion, directed specifically at the circuit associated with rail 1, applies equally to the circuit associated with rail 2. For convenience, the components associated with the rail 2 circuit bear identical reference numerals to the corresponding components for the rail 1 circuit except as specifically noted.

Accordingly, the present discriminator circuit includes an inverting amplifier 50 coupled to the output of scanner 12 through a capacitor 52. The input to amplifier 50 comprises a signal in the form of waveshape 39 or 41 depending on whether the signal is generated by the passing of a roller bearing or friction bearing. DC restoration of the input signal to the amplifier is accomplished through the contacts 54 of a relay 56. To this end, contacts 54 are closed at all times except when the wheel gate signal 33 is applied to the relay through a timing circuit 58 which receives the wheel gate signal on line 42 from dpu 22.

The inverted and amplified signal at the output of amplifier 50 is applied to peak storage capacitor 60 through diode 62 and contacts 64 of relay 56. Contacts 64 remain closed during the entire wheel gate and open at all other times so that the maximum value of the amplified heat signal is stored on capacitor 60 as a negative voltage.

The output of inverter 50 is also reinverted by a unity-gain inverter 66. The output of inverter 66 is peak-stored on capacitor 68 through diode 70 and contacts 72 of relay 74. Relay 74 is controlled by the timing circuit 58 to maintain the contacts closed during the sample gate 48 and open at other times. The SAMPLE GATE is generated from the time the wheel passes sensor 32 until it passes sensor 44. A positive voltage is stored on capacitor 68 representing the maximum signal value attained during the sample gate interval.

An additional pair of sets of contacts 76 and 78 of relay 56 are provided. These contacts, as with contacts 54 are opened during the wheel gate and closed at the termination of the wheel gate. Accordingly, at the termination of the wheel gate, the voltages stored on capacitors 60 and 68 are applied to the network of resistors 80 and 82 through contacts 76 and 78.

Figure 2:
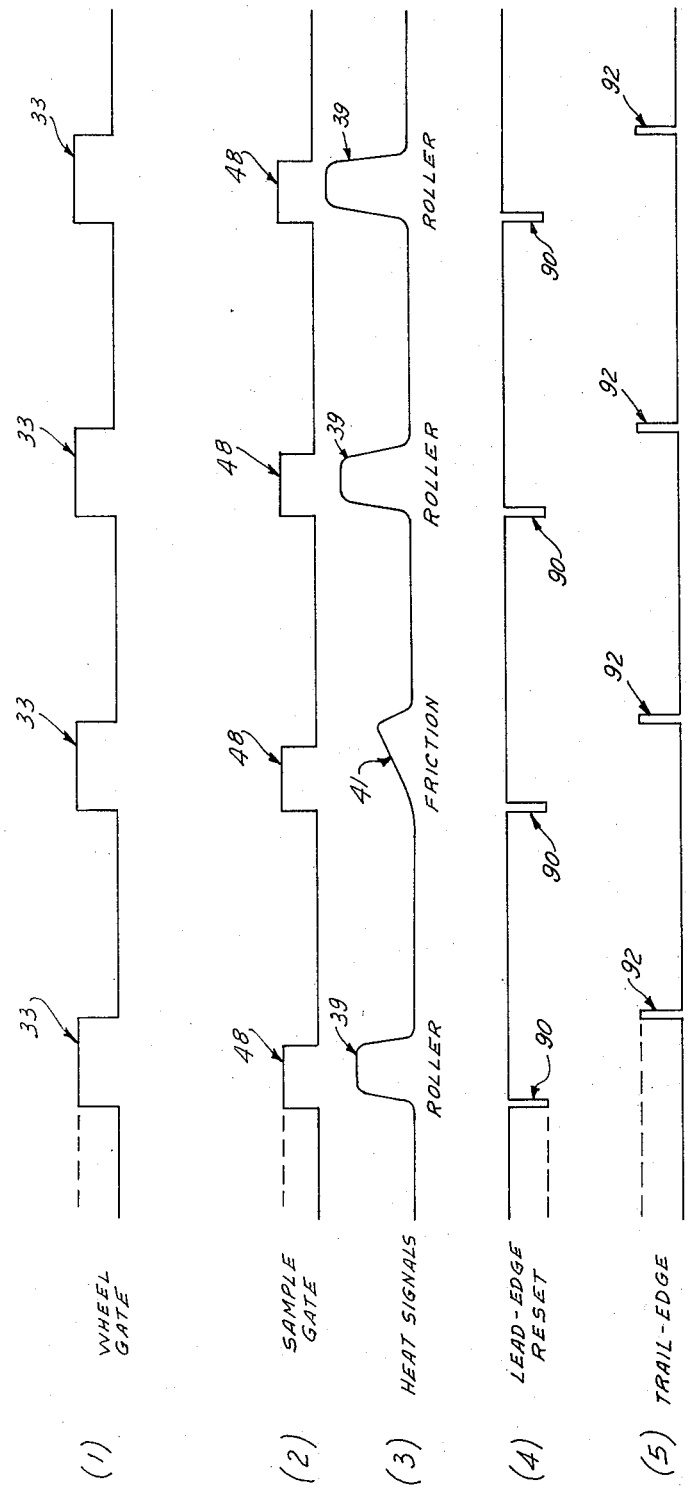
FIG. 2 is a diagram consisting of a series of graphs all on the same time scale illustrating various waveshapes through the circuit of FIG. 1 resulting from the passage of a train with both roller and friction bearings past a hot box detector system incorporating a roller bearing discriminator in accordance with the present invention.

Referring briefly to FIG. 2, line 3, it can be seen that the friction bearing heat signal 41 is generally triangular whereas the roller bearing signal 39 is generally rectangular. Also, the friction bearing heat signal 41 is longer in duration than the roller bearing heat signal. Both of these differences are utilized in the present roller bearing discriminator. As can be seen from FIG. 2, the maximum amplitude (V1) of the heat signal during the sample gate period for the rollerbearing signal 39 is substantially equal to the maximum amplitude (V2) of the heat signal during the entire wheel gate. On the other hand, the maximum amplitude (V1) of the friction bearing heat signal 41 during the sample gate is something less than the maximum amplitude of the heat signal for a friction bearing during the entire wheel gate interval. Accordingly, the ratio $V_2:V_1$ for a roller bearing is unity under idealized conditions and something substantially greater than unity for a friction bearing. In practice, however, a higher ratio of $V_2:V_1$ is employed to allow for component tolerances, noise, signal anomalies, etc. While a ratio as high as V2:V1= 2:1 may be employed, a ratio of substantially V2:V1=1.2:1 is preferred.

In order to test whether the ratio of $V_2:V_1$=1.2:1 or greater, the resistors 80 and 82 are in the ratio of 1:1.2. Depending upon the ratio of the stored voltages on capacitors 68 and 60, the voltage level at the junction 84 will be positive or negative; positive for a roller bearing, negative for a friction bearing. The junction 84 of resistors 80 and 82 is connected to the positive input of comparator 86 the negative input to which is grounded. Thus, comparator 86 detects the polarity of the resultant voltage at junction 84 and thus, whether or not a roller bearing is present since the output of the comparator will jump positive for a roller bearing only. Thus, a positive signal at the output of comparator 86 is a first indication that the bearing being sensed is a roller bearing.

Another function of the timing circuit 58 is to generate a lead edge pulse 90 (shown on line 4 of FIG. 2) and a trail edge pulse 92 (shown on line 5 of FIG. 2) in response to the leading and trailing edges of the input 42. These pulses represent the leading and trailing edge of each successive wheel gate 33. Referring back to FIG. 1, it can be seen that the output of comparator 86 forms an input to NAND gate 94. A second input to the NAND gate is a trail edge pulse 92 fed to the NAND gate through line 96 from the timing circuit 58. The output of NAND gate 94 is used to set a flip flop 98. The Q output of flip flop 98 comprises one input to a second NAND gate 100. The other input to NAND gate 100 comes from a threshold level detector as will be described forthwith.

The output of inverter 66 also serves as a positive input to comparator 102 through line 104. The negative input 106 to the comparator is set at a predetermined level. Thus, if the input along line 104 to comparator 102 exceeds a threshold level determined by the setting of variable resistor 108, the output of comparator 102 goes positive thereby closing semiconductor switch 110 so that flip flop 112 becomes set by the removal of positive voltage source 114 (i.e., switch 110 applies ground to the set input of flip flop 112). If both flip flops 98 and 112 are set the output of NAND gate 100 switches to logic zero (i.e., ground potential) and is applied to and sets flip flop 116. Thus, the setting of flip flop 116 provides a second indication of a roller bearing since, in order for flip flop 116 to be set, the heat scanner signal must exceed the roller bearing threshold level and also the V1:V2=1.2:1 ratio test must be met.

The present circuit contemplates still a third test which must be met before a determination that a roller bearing is being sensed is made. The third test is based on the fact that the bearings on both sides of the same axle, be they friction or roller bearings, must be the same.

As was previously stated, a circuit identical to the one just described for rail 1 is provided associated with rail 2. The corresponding components of the circuit associated with rail 2 have been numbered to correspond to the components of the rail 1 circuit with the exception of flip flop 118 which corresponds to flip flop 116. The Q outputs of flip flops 116 and 118 both form inputs to NAND gate 120. Thus, if both flip flops 116 and 118 are set, a signal will appear at the output 122 of gate 120. This signal requires that the bearings on both rails meet the two previously described tests for a roller bearing and thus itself forms the third test for the presence of a roller bearing. The presence of an output signal (logic zero) from gate 120 thus appears only when a roller bearing is being scanned and thus may be connected to the roller bearing indication terminal of an alarm, recorder, etc. Unless an output from gate 120 is present, the sensed bearing should be treated as a friction bearing. At the beginning of each wheel gate, all the flip flops are preset to the "friction bearing state" by the lead edge pulse 90 along line 124 feeding the reset terminal of each of the flip flops.

Thus, in accordance with the above, unless the heat signal of a scanned bearing meets the following three tests for a roller bearing, it is treated as a friction bearing. The three tests for a roller bearing are as follows:

1. the heat signal must exceed a predetermined threshold level;
2. the V2:V1 ratio must not be greater than 1.2:1; and,
3. the bearings on both sides of each axle meet the criteria of tests 1 and 2 above before either bearing is treated as a roller bearing.

Thus, in accordance with the above, the aforementioned objectives are effectively attained.

Having thus described the invention, what is claimed is:

1. In a railroad hot box detector system of the type including: heat responsive scanner means associated with a first rail of a section of track adapted to scan the bearings of a railraod car along said rail and generate an output signal in response thereto having an amplitude and wave form indicative of the temperature and type of bearing scanned and sensor means adapted to generate a first signal when a bearing enters the field of view of said scanner and a second signal when The bearing leaves the field of view of said scanner, the improvement comprising circuit means for discriminating between said types of bearings, said circuit comprising:

means for generating a third signal intermediate in time to said first and second signals;
first storage means connected to the output of said scanner for storing a charge indicative of the maximum amplitude of said scanner output signal between said first and second signals;
second storage means connected to the output of said scanner for storing a charge indicative of the maximum amplitude of said scanner output signal between said first and third signals; and
comparator means connected to said first and second storage means for comparing the amplitudes of the charges stored thereon.

2. The invention in accordance with claim 1 wherein said first and second signal generating means include a pair of wheel sensors spaced apart along a length of said first rail and said third signal generating means includes a third wheel sensor disposed along said first rail between said first and second sensors.

3. The invention in accordance with claim 1 wherein said first storage means includes a first capacitor and a first relay first set of contacts interposed between said capacitor and said heat scanner output, said first relay being operatively connected to said first and second signal generating means so as to close said first contacts when said first signal is generated and open said first contacts when said second signal is generated.

4. The invention in accordance with claim 3 wherein said second storage means includes a second capacitor and a second relay set of contacts interposed between said capacitor and said heat scanner output, said second relay being operatively connected to said first and third signal generating means so as to close said second relay contacts when said first signal is generated and open said second relay contacts when said third signal is generated.

5. The invention in accordance with claim 4 wherein said comparator means includes: a first resistor connected to said first capacitor, a second resistor connected to said second capacitor and to said first resistor, the values of said first and second resistors being in the inverse ratio of the expected value of the charges on said first and second capacitors for a particular form of bearing, and means connected to the junction of said resistors for determining if the charges on said capacitor are in said ratio.

6. The invention in accordance with claim 5 further comprising: a first inverting amplifier interposed between said scanner and said first capacitor, a unity-gain inverting amplifier interposed between said first inverting amplifier and said second capacitor and said determining means includes a comparator having a positive input connected to the junction of said resistors and a negative input being connected to ground whereby said comparator produces an output signal only if the ratio of the charges on said first and second capacitors is substantially equal to the inverse ratio of the resistance of said first and second resistors.

7. The invention in accordance with claim 6 further comprising a second set of contacts of said first relay interposed between said first capacitor and said first resistor and a third set of contacts of said first relay interposed between said second capacitor and said second resistor.

8. The invention in accordance with claim 6 further comprising second comparator means for comparing the output of said unity-gain amplifier to a predetermined threshold level and for generating a first gate input signal in response to outputs of said unity-gain amplifier above said threshold, gate means having one input connected to the output of said second comparator and one input connected to the output of said comparator whereby said gate means produces an output signal only if both said comparators produce output signals.

9. The invention in accordance with claim 8 further comprising an identical circuit associated with the second rail of said track, the output of the gate means of both of said circuits each forming an input to an additional gate, whereby said additional gate produces an output only if identical conditions exist on said first and second rails.

10. The invention in accordance with claim 5 wherein the ratio of said first resistor to said second resistor is 1:1.2, said ratio being indicative of a roller bearing on said rail as distinct from a friction bearing.

* * * * *